United States Patent

Makino et al.

[11] Patent Number: 4,512,893
[45] Date of Patent: Apr. 23, 1985

[54] POROUS AROMATIC IMIDE POLYMER MEMBRANE AND A PROCESS FOR ITS MANUFACTURE

[75] Inventors: Hiroshi Makino; Yoshihiro Kusuki; Takashi Harada; Hiroshi Shimazaki; Tosio Isida, all of Ichihara, Japan

[73] Assignee: UBE Industries, Ltd., Chiba, Japan

[21] Appl. No.: 367,954

[22] Filed: Apr. 13, 1982

[30] Foreign Application Priority Data

Apr. 14, 1981 [JP] Japan .................................. 56-54966
Apr. 14, 1981 [JP] Japan .................................. 56-54965

[51] Int. Cl.³ ........................ B29D 27/04; B32B 9/02
[52] U.S. Cl. .................................. 210/500.2; 55/158; 264/41; 264/176 F; 264/209.6; 264/216; 521/61; 521/63; 521/64; 528/229; 528/353
[58] Field of Search .............. 264/216, 41, 561, 49.5, 264/41, 176 F, 209 B; 210/500.2; 528/228, 183; 55/158; 521/61, 63, 64; 528/229, 353

[56] References Cited

U.S. PATENT DOCUMENTS

| | | | |
|---|---|---|---|
| 3,692,740 | 9/1972 | Suzuki et al. | 528/222 |
| 3,708,458 | 1/1973 | Alberino et al. | 528/222 |
| 3,862,897 | 1/1975 | Gattas et al. | 264/291 |
| 3,985,934 | 10/1976 | Farrissey et al. | 264/184 |
| 4,214,071 | 7/1980 | Alvino et al. | 528/183 |
| 4,284,594 | 8/1981 | Joh et al. | 264/41 |
| 4,290,936 | 9/1981 | Sasaki et al. | 528/183 |
| 4,307,135 | 12/1981 | Fox | 264/45.5 |
| 4,370,290 | 1/1983 | Makino et al. | 264/205 |
| 4,385,084 | 5/1983 | Zwama et al. | 264/41 |

Primary Examiner—Philip Anderson
Attorney, Agent, or Firm—Burgess, Ryan & Wayne

[57] ABSTRACT

A porous aromatic imide polymer membrane usable as a gas or liquid separator or concentrator is prepared by a process comprising the steps of:
(1) dissolving 3 to 30% by weight of an aromatic imide polymer which comprises at least 80 molar % of a recurring unit selected from those of the formulae (I) and (II):

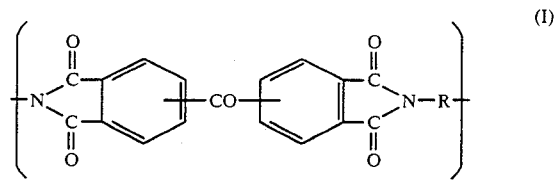

and

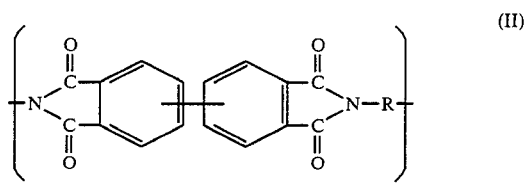

wherein R represents a divalent aromatic or heterocyclic radical in 70 to 97% by weight of a solvent consisting essentially of a homogeneous mixture of:
(A) 100 parts by weight of a base solvent which consists essentially of at least one polar organic compound and is capable of dissolving therein said aromatic imide polymer in a concentration of 5% by weight or more therein and of evaporating at a temperature of from 50° to 400° C., and
(B) 5 to 150 parts by weight of an additional liquid which consists essentially of at least one polar organic compound, is incapable of dissolving therein 3% by weight or more of said aromatic imide polymer and is capable of evaporating at a smaller evaporating rate than that of said base solvent at the above-mentioned evaporating temperature so as to provide a dope solution;
(2) forming a thin layer of the dope solution; and
(3) heating the thin layer of the dope solution at a temperature of from 50° to 400° C., whereby said mixed solvent is gradually evaporated from the thin layer of the dope solution.

14 Claims, No Drawings

POROUS AROMATIC IMIDE POLYMER MEMBRANE AND A PROCESS FOR ITS MANUFACTURE

FIELD OF THE INVENTION

The present invention relates to a process for producing a porous aromatic imide polymer membrane. More particularly, the present invention relates to a process for producing a porous membrane consisting essentially of an aromatic imide polymer prepared from an aromatic tetracarboxylic acid component and an aromatic diamine component by using a specific mixed solvent.

The porous aromatic imide polymer membrane prepared in accordance with the process of the present invention exhibits excellent gas- and liquid-separating property, excellent heat-resistance, a superior resistance to chemicals, and satisfactory mechanical properties. Accordingly, the porous aromatic imide polymer membrane produced in accordance with the present invention can be advantageously used to separate a gas mixture, for example, a hydrogen-carbon monoxide gas mixture, or a liquid mixture or to concentrate a gas or liquid. The porous membrane may be in the form of a flat film or a hollow fiber.

BACKGROUND OF THE INVENTION

The dense aromatic imide polymer film which has been hitherto known to be usable as a gas-separating membrane is limited to a dense membrane produced from pyromellitic acid and an aromatic diamine in the following manner. A polyamic acid is prepared by the polymerization of pyromellitic acid with an aromatic diamine. The resultant polyamic acid is dissolved in an organic polar solvent so as to produce a solution usable as a dope solution for producing membranes or films. In the preparation of the membrane or film, the dope solution is spread on the smooth surface of a film-forming device so as to form a thin layer of the dope solution and then the solvent is evaporated from the dope solution layer at a predetermined temperature. During or after the evaporating procedure, the polyamic acid is converted to the corresponding imide polymer so as to form a thin, solid film or membrane of the imide polymer.

The above-mentioned process for producing the imide polymer membrane is rather complicated and, therefore, the quality of the resultant membrane is not consistent.

Also, it is known that the conventional dense membrane consisting of an aromatic imide polymer exhibits a poor permeating rate in the case of a gas or liquid. Therefore, the conventional dense membrane made of the aromatic imide polymer can not be used to separate a gas mixture or a liquid mixture or to concentrate a gas or liquid unless the membrane is made very thin.

Accordingly, there has been a great demand for a porous membrane having a large permeating rate in the case of a gas or liquid and being produced from an aromatic imide polymer having excellent heat resistance. However, the above-mentioned type of porous aromatic imide polymer membrane having a satisfactory permeating rate in the case of a gas or liquid can not be obtained by means of conventional processes.

SUMMARY OF THE INVENTION

An object of the present invention is to provide a process for producing a porous aromatic imide polymer membrane having a satisfactory permeating rate in the case of a gas or liquid.

Another object of the present invention is to provide a process for producing a porous aromatic imide polymer membrane which can be used to separate a gas or liquid mixture and to concentrate a gas or liquid.

The above-mentioned objects can be attained by the process of the present invention, which comprises the steps of:

(1) dissolving 3 to 30% by weight of an aromatic imide polymer which comprises at least 80 molar % of at least one type of recurring unit selected from the group consisting of those of the formulae (I) and (II):

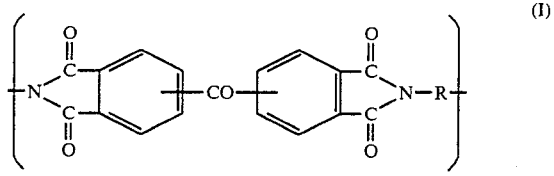

and

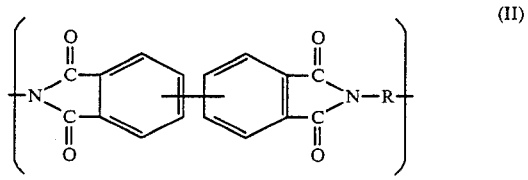

wherein R represents a member selected from divalent aromatic radicals, in 70 to 97% by weight of a solvent consisting essentially of a homogeneous mixture of:
(A) 100 parts by weight of a base solvent consisting essentially of at least one polar organic compound, which base solvent is capable of dissolving therein the aromatic imide polymer in a concentration of 5% by weight or more therein and of evaporating at a temperature of from 50° to 400° C., and
(B) 5 to 150 parts by weight of an additional liquid consisting essentially of at least one polar organic compound, which additional liquid is incapable of dissolving therein 3% by weight or more of the aromatic imide polymer and is capable of evaporating at a smaller evaporating rate than that of the base solvent at the above-mentioned evaporating temperature, to provide a dope solution;
(2) forming a thin layer of the dope solution; and
(3) heating said thin layer of the dope solution at a temperature of from 50° to 400° C., whereby the mixed solvent is gradually evaporated from the thin layer of said dope solution to form a porous aromatic imide polymer membrane.

DETAILED DESCRIPTION OF THE INVENTION

In the process of the present invention, it is essential that an aromatic imide polymer to be shaped into a porous membrane be dissolved uniformly in a specific mixed solvent of a base solvent and an additional liquid so as to provide a dope solution. The dope solution is used to produce a porous aromatic imide polymer membrane by forming a thin layer of the dope solution and by heating the thin layer so as to evaporate the mixed solvent. The process of the present invention is effective for producing a porous aromatic imide polymer membrane at an enhanced reproductivity rate by means of the above-mentioned dry-evaporating method. The resultant porous membrane exhibits a satisfactory permeability in the case of a gas or liquid.

Usually, a porous polymer membrane, which can be used to separate a gas or liquid mixture, is produced in a wet process wherein a thin layer is formed from a dope solution of the polymer, the dope solution layer is coagulated in a coagulating liquid, and the resultant coagulated polymer membrane is dried. In the process of the present invention, however, no coagulating liquid is necessary to produce a solid porous aromatic imide polymer membrane, and it is easy to recover the mixed solvent during the porous membrane-producing process.

In the process of the present invention, not only a porous membrane in the form of a flat film can be produced but also porous membranes in the form of hollow filaments or hollow tubes can be readily produced.

The porous aromatic imide polymer membrane produced in accordance with the present invention exhibits an enhanced permeating rate in the case of a gas liquid substance and, therefore, can be used to separate a gas or liquid mixture and to concentrate a gas or liquid substance.

It also exhibits excellent thermal resistance and a superior resistance to chemicals and has satisfactory mechanical properties.

The aromatic imide polymer usable for the process of the present invention comprises at least 80 molar %, preferably at least 90 molar %, of at least one type of recurring unit selected from the group consisting of those of the formulae (I) and (II):

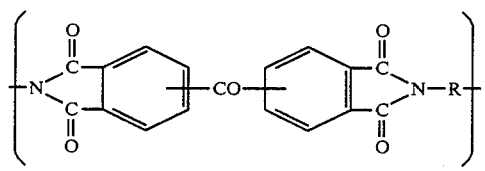

(I)

and

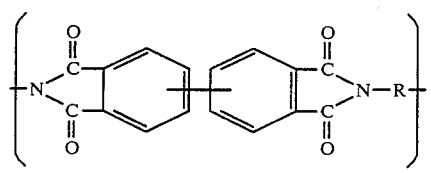

(II)

wherein R represents a member selected from divalent aromatic radicals which includes divalent aromatic heterocyclic radicals.

The divalent radical represented by R may be a residue of an aromatic or heterocyclic diamine of the formula: $H_2N-R-NH_2$, from which two amino groups are excluded.

In the formulae (I) and (II), R may represent a member selected from the group consisting of divalent radicals of the following formulae:

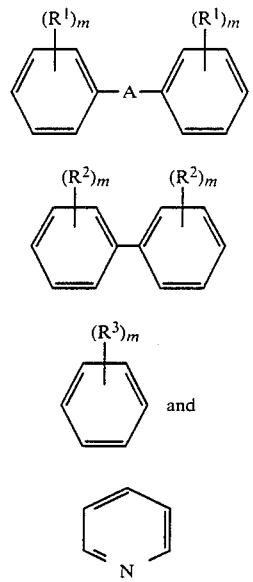

wherein $R^1$, $R^2$, and $R^3$, respectively, represent, independently from each other, a member selected from the group consisting of a hydrogen atom, lower alkyl radicals having 1 to 3 carbon atoms, and lower alkoxyl radicals having 1 to 3 carbon atoms; A represents a divalent linking member selected from the class consisting of $-O-$, $-S-$, $-CO-$, $-SO_2-$, $-SO-$, $-CH_2-$, and $-C(CH_3)_2-$; and m represents an integer of from 1 to to 4.

It is preferable that the aromatic imide polymer exhibit a logarithmic viscosity of from 0.3 to 7.0, more preferably from 0.4 to 5.5 and still more preferably from 0.5 to 4.0, which has been determined at a concentration of 0.5 g per 100 ml of a solvent consisting of a mixture of four parts by volume of p-chlorophenol and one part by volume of o-chlorophenol at a temperature of 30° C.

Also, it is preferable that the aromatic imide polymer have a degree of imidization of at least 90%, more preferably at least 95%.

The term "degree of imidization" used herein refers to the proportion in percent of the real amount of imide bonds existing in a polymeric chain of an aromatic polyimide to the theoretical amount of imide bonds which can theoretically exist in the polymeric chain. The amount of imide bonds can be determined by means of infrared absorption spectrum analysis. That is, the amount of imide bonds can be determined from the height of the absorption peaks at 1780 cm$^{-1}$ and 720 cm$^{-1}$.

The aromatic imide polymer usable for the present invention can be prepared by bringing about a polymerization reaction between a tetracarboxylic acid component comprising at least 80 molar %, preferably 90 molar %, of at least one tetracarboxylic acid selected from the group consisting of benzophenone tetracarboxylic acids such as 3,3',4,4'-and 2,3,3',4'-benzophenone tetracarboxylic acids and biphenyl tetracarboxylic acids such as 3,3',4,4'-and 2,3,3'4'-biphenyl tetracarboxylic acids and a diamine component comprising at least one aromatic diamine of the formula, $H_2N-R-NH_2$, wherein R is as defined above, and by an imidization (imide ring-cyclization) reaction of the resultant polyamic acid. The polymerization and imidization reactions can be brought about by means of any conventional process.

The aromatic polyimide usable for the process of the present invention can be prepared in the following manner. That is, a tetracarboxylic acid component and an aromatic diamine component, the molar amounts of which are approximately equal, are dissolved in an organic polar solvent, for example, N-methylpyrrolidone, pyridine, N,N-dimethylacetamide, N,N-dimethylformamide, dimethyl sulfoxide, tetramethyl urea, phenol, or cresol; the solution is heated at a temperature of about 120° C. or less, preferably from 0° to 60° C., so as to allow the tetracarboxylic acid component and the aromatic diamine component to be polymerized with each other so as to provide a polyamic acid having a logarithmic viscosity of 0.3 or more, preferably 0.4 to 7, determined at a concentration of 0.5 g per 100 ml of N-methyl pyrrolidone at a temperature of 30° C.; and the solution of the polyamic acid in the organic polar solvent, which solution can be the above-mentioned polymerization reaction mixture itself, is subjected to an imidization reaction at a temperature of from 5° to 200° C. by using an imidization accelerator consisting of at least one member selected from tertiary amine compounds such as trimethyl amine, triethyl amine and pyridine, acetic anhydride, sulfonyl chloride, and carbodiimide. In another method, the imidization procedure may be carried out at a temperature of from 100° to 300° C., preferably from 120° to 250° C., without using the imidization accelerator. The resultant imide polymer has a degree of imidization of 90% or more and is isolated in the form of fine particles from the reaction mixture by means of precipitation.

In another process for producing the aromatic imide polymer, a solution of polyamic acid in an organic polar solvent, which solution is prepared by means of the above-mentioned process and which has a logarithmic viscosity of 0.5 or more determined at a concentration of 0.5 g per 100 ml of N-methylpyrrolidone at a temperature of 30° C., is mixed with a large amount of a precipitating agent consisting of acetone or an alcohol so as to allow the polyamic acid to precipitate from the solution. In another manner, the solution of polyamic acid is mixed with the precipitating agent while evaporating the organic polar solvent from the solution so as to allow the polyamic acid to precipitate from the reaction mixture. The polyamic acid precipitate is isolated in the form of fine particles from the reaction mixture, and the isolated polyamic acid is heated at a temperature of from 150° to 300° C. until the degree of imidization of the resultant imide polymer reaches 90% or more.

In still another process for producing the aromatic imide polymer, a tetracarboxylic acid component and an aromatic diamine component are polymerized and imidized in a single step in a phenolic compound in the state of a liquid or melt at a temperature of from 120° to 400° C., preferably from 150° to 300° C.

In the above-mentioned processes for producing the aromatic imide polymer, the tetracarboxylic acid component may comprise as a main ingredient at least one member selected from benzophenone tetracarboxylic acid compounds and biphenyl tetracarboxylic acid compounds.

The benzophenone tetracarboxylic acid compounds may be selected from free acids, dianhydrids, salts and lower alkyl esters of 3,3',4,4'benzophenone tetracarboxylic acid (S-BTDA) and 2,3,3',4'-benzophenone tetracarboxylic acid.

The biphenyl tetracarboxylic acid compounds may be selected from free acids, dianhydrides, salts and lower alkyl esters of 3,3',4,4'-biphenyl tetracarboxylic acid (S-BPDA) and 2,3,3',4'-biphenyl tetracarboxylic acid.

The above-mentioned tetracarboxylic acids may be used in mixtures thereof.

The tetracarboxylic acid component may contain, in addition to the above-mentioned specific tetracarboxylic acids, 20 molar % or less, preferably 10 molar % or less, based on the entire amount of the tetracarboxylic acid component, of one or more other tetracarboxylic acids, for example, pyromellitic acid, 2,2-bis(3,4-dicarboxyphenyl)propane, bis(3,4-di-carboxyphenyl)sulfone, bis(3,4-dicarboxyphenyl)ether, bis(3,4-dicarboxyphenyl)thioether, bis(3,4-dicarboxyphenyl)methane, butane tetracarboxylic acid, and anhydrides, salts and esters thereof.

The aromatic diamines usable for producing the aromatic imide polymer may be selected from the group consisting of those of the formulae (III), (IV), (V) and (VI):

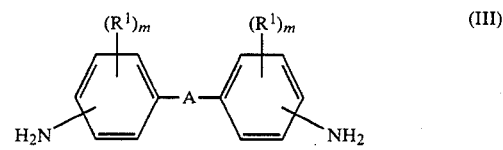

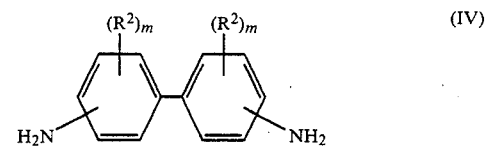

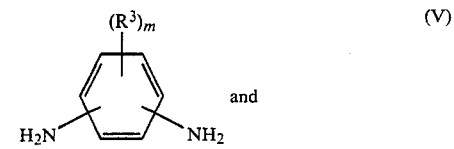

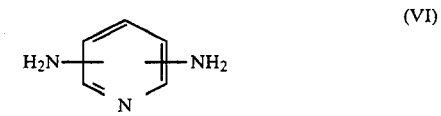

wherein $R^1$, $R^2$, $R^3$, A, and m are as defined hereinabove.

The aromatic diamines of the formula (III) may involve: diphenyl ether compounds, for example, 4,4'-diaminodiphenyl ether (hereinafter referred to as DADE for brevity), 3,3'-dimethyl-4,4'-diaminodiphenyl ether, 3,3'-dimethoxy-4,4'-diaminodiphenyl ether, 3,3'-diaminodiphenyl ether, and 3,4'-diaminodiphenyl ether; diphenyl thioether compounds, for example, 4,4'-diaminodiphenyl thioether, 3,3'-dimethyl-4,4'-diaminodiphenyl thioether, 3,3'-dimethoxy-4,4'-diaminodiphenyl thioether, and 3,3'-diaminodiphenyl ether; benzophenone compounds, for example, 4,4'-diaminobenzophenone and 3,3'-dimethyl-4,4'-diaminobenzophenone; diphenyl methane compounds, for example, 3,3'-diaminodiphenyl methane, 4,4'-diaminodiphenyl methane (hereinafter referred to as DADM for brevity), 3,3'-dimethoxy-4,4'-diaminodiphenyl methane, and 3,3'-dimethyl-4,4'-diaminodiphenyl methane; bisphenyl propane compounds, for example, 2,2-bis(4-aminophenyl)propane and 2,2-bis(3-aminophenyl)propane; 4,4'-diaminophenyl sulfoxide; 4,4'-diaminodiphenyl sulfone; and 3,3'-diamino-diphenyl sulfone.

The aromatic diamines of the formula (IV) may involve benzidine, 3,3'-dimethyl benzidine, 3,3'-dimethoxybenzidine (ortho-dianisidine), and 3,3'-diaminobiphenyl.

The diamine of the formula (V) is selected from o-, m-, and p-phenylene diamines. The aromatic diamines of the formula (VI) may be selected from 2,6-diamiopyridine, 2,5-diaminopyridine, and 3,4-diaminopyridine.

It is preferable that the aromatic diamine component consist of at least one member selected from the group consisting of 4,4'-diaminodiphenyl ether (DADE), 4,4'-diaminodiphenyl thioether, 4,4'-diaminodiphenyl methane (DADM), 3,3'-dimethoxy benzidine (ortho-dianisidine), and 3,3'-dimethyl benzidine. The aromatic diamine component may consist of two or more of the above-mentioned diamine compounds.

In the process of the present invention, the dope solution to be converted into a porous membrane is prepared by dissolving 3 to 30% by weight, preferably 5 to 25% by weight, of the aromatic imide polymer in 70 to 97% by weight, preferably 75 to 95% by weight, of a specific solvent consisting essentially of a homogeneous mixture of (A) 100 parts by weight of a base solvent consisting essentially of at least one polar organic compound, which base solvent is capable of dissolving therein at least 5% by weight, preferably at least 6% by weight, of the aromatic imide polymer and of evaporating at a temperature of from 50° to 400° C., and (B) 5 to 150 parts by weight, preferably 10 to 140 parts by weight, of an additional solvent consisting essentially of at least one polar organic solvent, which additional solvent is capable of dissolving therein only less than 3% by weight, preferably 1.5% by weight, of the aromatic imide polymer and of evaporating at a smaller evaporating rate than that of the above-mentioned base solvent at the above-mentioned evaporating temperature.

The base solvent preferably consists essentially of at least one phenolic compound having a melting point of approximately 100° C. or less, more preferably 80° C. or less, and a boiling point of approximately 300° C. or less, more preferably 280° C. or less, under atmospheric pressure. The phenolic compound may be selected from the group consisting of phenol, alkyl-substituted monohydric phenol compounds, and halogenated monohydric phenol compounds.

The alkyl-substituted monohydric phenol compound can be selected from the group consisting of o-, m-, and p-cresols, 3,5-xylenol, carvacrol, and thymol.

The most preferably phenolic compounds for the base solvent are the halogenated monohydric phenol compounds having a melting point of about 100° C. or less and a boiling point of about 300° C. or less under atmospheric pressure. The halogenated monohydric phenol compounds can be selected from those of the formula

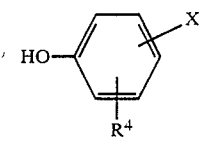

wherein $R^4$ represents a member selected from the group consisting of a hydrogen atom and alkyl radicals having 1 to 3 carbon atoms and X represents a halogen atom. In the above-mentioned formula, it is preferable that the substituent X be located in the p- or m- position in relation to the hydroxyl group. These halogenated phenol compounds have a high ability to dissolve the aromatic imide polymer.

The halogenated phenol compounds usable for the process of the present invention include 3-chlorophenol, 4-chlorophenol (P-chlorophenol, hereinafter referred to as PCP for brevity), 3-bromophenol, 4-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxytoluene, 3-bromo-6-hydroxytoluene, and 4-bromo-2-hydroxytoluene.

As an additional solvent usable for the mixed solvent, there is used an organic polar solvent which is incapable of dissolving 3% by weight or more, preferably 1.5% by weight or more, of the aromatic imide polymer and is capable of evaporating at a smaller evaporating rate than that of the base solvent at a temperature of from 30° to 400° C. In addition, it is natural that the additional liquid should be compatible with the base solvent.

The additional liquid may consist essentially of at least one polar aromatic compound which has a boiling point of at least 5° C., preferably 10° to 200° C., above that of the base solvent, which is incapable of dissolving therein 3% by weight or more of the aromatic imide polymer, and which is compatible with the base solvent. The additional liquid may consist essentially of at least one polar aromatic compound which has a boiling point in the range of from a temperature of 30° C. below the boiling point of the base solvent to a temperature of 5° C. above the boiling point of the base solvent, which has an ionization potential of at least 0.1 ev, preferably at least 0.2 ev, below that of the base solvent, which is incapable of dissolving therein 3.0% by weight or more of the aromatic imide polymer and which is compatible with the base solvent.

Examples of the organic compounds usable for the additional liquid are phenanthrene, o-terphenyl, p-terphenyl, -chloronaphthalene, triphenylphosphine, triphenylamine, aniline, naphthalene, 1-methylnaphthalene, 2-methylnaphthalene, dimethylnaphthalene, anthracene, and 1,2-benzanthracene.

The mixed solvent for the aromatic imide polymer consists essentially of 100 parts by weight of the base solvent having a high dissolving activity on the aromatic imide polymer and 5 to 150 parts by weight, preferably 10 to 140 parts by weight, of the additional liquid having a poor dissolving activity on the aromatic imide polyer. The mixed solvent, as a whole, must be able to uniformly dissolve therein the aromatic imide polymer. Therefore, the amount of the additional liquid to be contained in the mixed solvent should be limited to such an extent that the aromatic imide polymer does not precipitant from the resultant dope solution.

The composition of the mixed solvent can be predetermined in consideration of the solubility of the aromatic imide polymer in the mixed solvent and the processability of the resultant dope solution.

In the dope solution of the present invention, the aromatic imide polymer must be uniformly dissolved in a concentration of from 3 to 30% by weight, preferably from 5 to 25% by weight, in the mixed solvent consisting essentially of the base solvent and the additional liquid.

The dope solution may be prepared by any conventional method. For example, the dope solution can be prepared by subjecting the tetracarboxylic acid component and the aromatic diamine component to the single-step polymerization-imidization procedure in a phenolic solvent in the state of a liquid or melt at a temperature of from 120° to 400° C., as is described for the production of the aromatic polyimide, and by mixing the resultant polymerization-imidization reaction mixture with a necessary amount of an additional liquid.

On the other hand, in the case where the aromatic imide polymer is prepared as an isolated product in the form of fine particles, the dope solution usable for the process of the present invention can be prepared by dissolving the imide polymer particles in a mixed solvent comprising a base solvent and an additional liquid.

It is preferable that the dope solution of the aromatic imide polymer be a homogeneous liquid and exhibit a rotation viscosity of at least 500 centipoises, preferably from 10 to 10,000 poises, at a thin-layer-forming temperature.

In the process of the present invention, the dope solution is formed into a thin layer at a temperature of about 50° to about 180° C., preferably from 60° to 150° C. The thin layer of the dope solution is heat-dried at a temperature of from about 50° to about 400° C., preferably from 70° to 250° C., so as to gradually evaporate the mixed solvents.

In the process of the present invention, it is preferable that the dope solution be filtered and degassed at a temperature of from 20° to 180° C., preferably from 50° to 150° C., before the thin-layer-forming step is carried out.

In the process of the present invention, the thin layer of the dope solution may be produced and may be converted to a dry solid membrane by any conventional method. For example, a dope solution having the above-mentioned composition, which has been filtered and degassed, is coated or spread on a smooth surface of a substrate at a temperature of from about 50° to about 180° C., preferably from 60° to 150° C., so as to form a thin layer of the dope solution having a weight of 10 to 5000 g/m². The thin layer of the dope solution is dried by gradually evaporating the mixed solvent at a temperature of from about 50° to about 400° C., preferably from 60° to 350° C. and more preferably from 80° to 300° C., thereby producing a solidified porous aromatic imide polymer membrane. Finally, the porous imide polymer membrane is separated from the surface of the substrate.

The heating procedure is carried out for the purpose of gradually evaporating the mixed solvent from the thin layer of the dope solution. Therefore, it is preferable that the heating procedure is carried out at a relatively low temperature, for example, from 50° to 200° C., preferably from 60° to 150° C., for a long period of time. However, in order to enhance the productivity of the porous membrane, it is preferable that the heating temperature be elevated stepwise from 50° C. to 300° C. For example, the heating procedure is carried out firstly at a temperature of from 50° to 150° C., secondly at a temperature of from 30° to 80° C. above the first temperature, and thirdly at a temperature of from 30° to 80° C. above the second temperature. The third heating step may be followed by a fourth heating step carried out at a temperature higher than the temperature of the third heating step.

In the above-mentioned heating procedure, the heating time in each stage is variable depending on the type of aromatic imide polymer contained in the dope solution, the type of base and additional solvents, the concentration of the aromatic imide polymer in the dope solution, and the heating temperature. Therefore, the heating time may be suitably determined in consideration of the above-mentioned variables. It is preferable that the resultant solid porous membrane have a thickness of from 5 to 500 microns and a weight of from 1 to 600 g/m².

The substrate having a smooth surface on which the dope solution is applied may include a glass plate, a copper plate, a steel plate, a metal plate plated with a suitable metal, a heat-resistant resin plate, and a metallic roll or belt having a smooth surface. It is necessary that the resultant solid membrane be readily separated from the smooth surface of the substrate.

In accordance with the process of the present invention, a porous aromatic imide polymer membrane can be continuously produced in the following manner. A dope solution of an aromatic imide polymer having a rotation viscosity of from about 500 to about 100,000 centipoises is extruded through a slit having a width of from about 0.1 to about 1 mm toward the smooth peripheral surface of a rotating metallic drum or belt at an extrusion temperature of from about 50° C. to about 150° C. The extruded stream of the dope solution is spread on the peripheral surface of the rotating metallic drum or belt by its own spontaneous spreading property or by means of a doctor blade provided on the metallic roll or belt so as to form a thin layer of dope solution having a uniform thickness. Then the thin layer formed on the rotating drum on belt surface is dried at a temperature of from about 50° to about 400° C. either by blowing a heated inert gas toward the thin layer or by applying thermic rays from an electric heater thereonto. This heating procedure causes the mixed solvent contained in the thin layer to gradually evaporate so that a solid porous aromatic imide polymer membrane is produced. Finally, the imide polymer membrane is separated from the roll or belt surface. The separated porous membrane is preferably washed with methyl alcohol and/or acetone so as to completely remove the residual mixed solvent.

The process of the present invention is advantageous in that no coagulating liquid is used to produce the porous imide polymer membrane. Also, it should be noted that the process of the present invention makes it possible for the first time to produce a specific porous aromatic imide polymer membrane from a specific dope solution thereof by means of a dry method is which no coagulating liquid is used.

According to the process of the present invention, a porous aromatic imide polymer membrane can be stably produced on an industrial scale by means of a continuous dry method involving easy procedures.

The porous aromatic imide polymer membrane prepared in accordance with the process of the present invention exhibits such an excellent heat resistance that the membrane can be used to separate a gas or liquid mixture at an elevated temperature of from about 50° to about 350° C. Furthermore, the porous membrane of the present invention exhibits a satisfactory gas- and liquid-permeating rate, a superior chemical-resisting property, and excellent mechanical properties.

Therefore, the porous membrane of the present invention can be used to separate a gas or liquid mixture and to concentrate a gas or liquid. For example, the porous membrane of the present invention can be beneficially used to separate a hydrogen-carbon monoxide gas mixture and to concentrate the separated gases. The porous aromatic imide polymembrane of the present invention may be coated with a dense layer of an aromatic imide polymer or another polymer, which dense layer is capable of separating a gas or liquid mixture, so as provide a composite type of separating membrane.

Examples of the present invention and comparative examples are illustrated below.

In the examples and comparative examples, the gas-permeability (permeating rate) of the imide polymer membrane was determined by means of the following gas-transmission test. The membrane to be tested was placed in a stainless steel cell having a permeating area of 14.65 cm$^2$, and hydrogen gas and carbon monoxide gas were supplied separately to the cell under a pressure of 3.0 kg/cm$^2$G. The amount (volume) of gas passed through the membrane was measured with a flow meter.

The gas-permeability (P) of each gas was calculated from the following equation:
Gas-permeability (P) (cm$^3$/cm$^2$ sec cmHg)=(X/(A×T×D)
wherein X represents the amount (volume) in cm$^3$ (STD) of gas passed through the membrane, A represents the permeating surface area in cm$^2$ of the membrane through which the gas passed, T represents the transmission time in seconds of the gas passed through the membrane, and D represents the difference in pressure in cmHg between the gas-supply side and the opposite side of the membrane.

EXAMPLES 1 THROUGH 4

In each of Examples 1 through 4, a separable flask equipped with a stirrer and with a conduit for introducing thereinto nitrogen gas was charged with 57.4 millimoles of 3,3',4,4'-benzophenone tetracarboxylic dianhydride (S-BTDA), 57.4 millimoles of 4,4'-diaminodiphenyl ether (DADE), and 270 g of N-methyl-2-pyrrolidone (NMP). The reaction mixture was subjected to a polymerization procedure at an ambient temperature (20° C.) for three hours while flowing nitrogen gas through the conduit and the flask so as to prepare a solution of a polyamic acid in NMP.

The resultant solution was mixed with 200 g of NMP, 27.5 g of pyridine, and 35.5 g of acetic anhydride. Then the mixture was heated gradually to a temperature of 80° C. and was maintained at this temperature for one hour while being vigorously stirred so as to convert the polyamic acid to the corresponding imide polymer. An excessive amount of methyl alcohol was added to the mixture while it was being vigorously stirred so as to allow the resultant imide polymer to completely precipitate. The precipitated imide polymer was collected by means of filtration, was washed with methyl alcohol, and then was dried. A aromatic imide polymer powder was obtained.

The imide polymer exhibited a logarithmic viscosity of 2.05, which viscosity was determined at a concentration of 0.5 g per 100 ml of a solvent consisting of a mixture of 4 parts by volume of p-chlorophenol and 1 part by volume of o-chlorophenol at a temperature of 30° C. and was calculated in accordance with the following equation.

$$\text{Logarithmic viscosity} = \frac{\text{natural logarithm}\left(\frac{\text{viscosity of solution}}{\text{viscosity of solvent}}\right)}{\text{concentration of polymer in solution}}$$

The imide polymer exhibited a degree of imidization of 95% or more.

A dope solution was prepared by first mixing 10 g of the imide polymer, 90 g of p-chlorophenol (PCP), and the type and amount of the additional solvent indicated in Table 1 in a separable flask with a stirrer and by then heating the mixture to a temperature of approximately 100° C. while stirring the mixture so as to homogenously dissolve the imide polymer in the mixed solvent. The solution was filtered and degassed at a temperature of approximately 80° C.

The dope solution had a rotation viscosity of approximately 10 poises at a temperature of 60° C.

The dope solution was spread on the surface of a clean, flat glass at a temperature of 60° C. by using a doctor blade to form a thin layer of the dope solution having a uniform thickness of 0.2 mm. The thin layer of the dope solution on the glass plate was heated at a temperature of 100° C. for 3 hours so as to gradually evaporate the mixed solvent. Thus, a resultant porous imide polymer membrane having a thickness of approximately 20 microns was obtained.

The resultant porous membrane was subjected to a gas-permeating test. The results of the test are shown in Table 1.

COMPARATIVE EXAMPLES 1 AND 2

In each of Comparative Examples 1 and 2, an imide polymer membrane was prepared in accordance with the same procedures as those described in Example 1 except that the additional solvent indicated in Table 1 was used in the amount indicated in Table 1.

The resultant imide polymer membrane was subjected to a gas-transmission test. The results are shown in Table 1.

TABLE 1

| | Aromatic imide polymer composition (dope solution) | | | | | | | |
|---|---|---|---|---|---|---|---|---|
| | Imide polymer | | | | Base solvent | | | |
| Example No. | Monomer | Degree of imidization (%) | Logarithmic viscosity (30° C.) | Amount (g) | Type | Boiling point (°C.) | Ionization potential (ev) | Amount (g) |
| Example 1 | S-BTDA DADE | 95% or more | 2.05 | 10 | PCP | 219 | 9.07 | 90 |
| Example 2 | S-BTDA | " | " | 10 | " | " | " | 90 |

TABLE 1-continued

| Example No. | | | | Amount (g) | | | | |
|---|---|---|---|---|---|---|---|---|
| Example 3 | S-BTDA DADE | " | " | 10 | " | " | " | 90 |
| Example 4 | S-BTDA DADE | " | " | 10 | " | " | " | 90 |
| Comparative Example 1 | S-BTDA DADE | " | " | 10 | " | " | " | 90 |
| Comparative Example 2 | S-BTDA DADE | " | " | 10 | " | " | " | 90 |

| Example No. | Aromatic imide polymer composition (dope solution) Additional solvent | | | Gas-transmission test | |
|---|---|---|---|---|---|
| | Type | Boiling point (°C.) | Ionization potential (ev) | Amount (g) | Hydrogen permeability ($PH_2$) $\left( \dfrac{cm^3}{cm^2 \cdot sec\ cmHg} \right)$ | Permeating rate ratio $PH_2/P_{CO}$ |
| Example 1 | Phenanthrene | 336 | 8.1 | 35 | $5.2 \times 10^{-2}$ | 2.8 |
| Example 2 | O—terphenyl | 212 | 8.1 | 40 | $1.6 \times 10^{-3}$ | 3.2 |
| Example 3 | α-chloro-naphthalene | 259 | 8.1 | 89 | $9.0 \times 10^{-2}$ | 3.0 |
| Example 4 | Triphenyl phosphine | 360 | 7.4 | 20 | $1.6 \times 10^{-4}$ | 3.5 |
| Comparative Example 1 | O—dichlorobenzene | 181 | 9.1 | 41 | $4.0 \times 10^{-7}$ | 47 |
| Comparative Example 2 | 1,2,3-trichlorobenzene | 210 | 9.5 | 43 | $4.5 \times 10^{-7}$ | 41 |

Each organic polar solvent per se, which was used as the additional solvent in the examples and the comparative examples, was substantially incapable of dissolving the aromatic imide polymer powder having a degree of imidization of 95% or more and a logarithmic viscosity of 2.05.

From the results of Examples 1 through 4 and Comparative Examples 1 and 2, it is apparent that in the case where an organic polar solvent having a much higher boiling point than that of the base solvent was used as the additional solvent the resultant porous imide polymer membrane exhibited excellent properties as shown in Examples 1, 3, and 4. Also, it is evident that even when an organic polar solvent having a slightly lower boiling point than that of the base solvent was used as the additional solvent, as long as the ionization potential of the additional solvent was significantly lower than that of the base solvent, the resultant porous imide polymer membrane exhibited excellent properties, as indicated in Example 2, because the additional solvent was evaporated at a lower evaporating rate than that of the base solvent when the heating procedure was carried out on the thin layer of the dope solution.

In contrast, when an organic polar solvent having a lower boiling point than that of the base solvent was used as the additional solvent, as is shown in Comparative Example 1, since the additional solvent was evaporated at a higher evaporating rate than that of the base solvent, the resultant porous imide polymer membrane exhibited a poor gas-permeating rate. That is, in this case, the gas-per-meating rate of the resultant porous imide polymer corresponded to that of the usual dense, nonporous membrane.

In addition, even when an organic polar solvent having a slightly lower boiling point than that of the base solvent was used as the additional solvent, when the ionization potential of the additional solvent was significantly higher than that of the base solvent, as is shown in Comparative Example 2, the resultant porous imide polymer membrane exhibited a decreased gas-permeating rate, because the additional solvent was evaporated more rapidly than the base solvent when the heating procedure was carried out on the thin layer of the dope solution. The membrane prepared in Comparative Example 2 exhibited a performance similar to that of the usual dense nonporous membrane.

EXAMPLES 5 THROUGH 8

In each of Examples 5 through 8, a separable flank equipped with a stirrer and with a conduit for introducing nitrogen gas thereinto was charged with 40 millimoles of 3,3',4,4'-biphenyl tetracarboxylic dianhydride (S-BPDA), 40 millimoles of 4,4'-diaminodiphenyl ether (DADE), and 178 g of p-chlorophenol (PCP). The reaction mixture was subjected to a polymerization procedure by elevating the temperature of the reaction mixture to the level of 180° C. in approximately one hour and then by maintaining the temperature of the reaction mixture at the above-mentioned level for five hours while flowing nitrogen gas through the conduit and the flask so as to prepare a solution of an imide polymer in PCP.

The resultant reaction mixture was mixed with a large amount of a precipitating agent consisting of methylene chloride and methyl alcohol so as to allow the resultant imide polymer to precipitate from the mixture. The precipitated imide polymer was collected by means of filtration, was washed with methyl alcohol, and then was dried. An imide polymer powder was obtained.

The imide polymer exhibited a degree of imidization of 95% or more and a logarithmic viscosity of 2.18 determined by the above-mentioned method.

A dope solution was prepared in the same manner as that described in Example 1 except that the type and amount of the additional solvent were as indicated in Table 2. Then, the dope solution was converted to a porous membrane having a thickness of approximately 10 microns by means of the same method as that described in Example 1.

The resultant porous membrane was subjected to a gas-permeating test. The results of the test are indicated in Table 2.

COMPARATIVE EXAMPLES 3 THROUGH 5

In each of Comparative Examples 3 through 5, an imide polymer membrane was prepared in accordance with the same procedures as those described in Example 5 except that the additional solvent indicated in Table 2 was used in the amount indicated in Table 2.

The resultant polyimide membrane was subjected to the afore-mentioned gas-transmission test. The results are shown in Table 2.

tional liquid, as long as the ionization potential of the additional liquid was significantly lower than that of the base solvent, the resultant porous imide polymer membrane exhibited excellent properties, as indicated in Example 6, because the additional liquid was evaporated at a lower evaporating rate than that of the base liquid when the heating procedure was carried out on the thin layer of the dope solution.

In contrast, when an organic polar solvent having a significantly lower boiling point than that of the base solvent was used as the additional liquid, as is shown in Comparative Examples 3 and 4, since the additional liquid was evaporated at a higher evaporating rate than that of the base solvent, the resultant imide polymer membrane exhibited a poor gas-permeating rate. That

TABLE 2

| | Aromatic imide polymer composition (dope solution) | | | | | | |
|---|---|---|---|---|---|---|---|
| | Aromatic imide polymer | | | Base solvent | | | |
| Example No. | Monomer | Degree of imidization (%) | Logarithmic viscosity (30° C.) | Amount (g) | Type | Boiling point (°C.) | Ionization potential (ev) | Amount (g) |
| Example 5 | S-BPDA DADE | 95% or more | 2.18 | 10 | PCP | 219 | 9.07 | 90 |
| Example 6 | S-BPDA DADE | " | " | 10 | " | " | " | 90 |
| Example 7 | S-BPDA DADE | " | " | 10 | " | " | " | 90 |
| Example 8 | S-BPDA DADE | " | " | 10 | " | " | " | 90 |
| Example 3 | S-BPDA DADE | " | " | 10 | " | " | " | 90 |
| Comparative Example 4 | S-BPDA DADE | " | " | 10 | " | " | " | 90 |
| Comparative Example 5 | S-BPDA DADE | " | " | 10 | " | " | " | 90 |

| | Aromatic imide polymer composition (dope solution) Additional solvent | | | | Gas-transmission test | |
|---|---|---|---|---|---|---|
| Example No. | Type | Boiling point (°C.) | Ionization potential (ev) | Amount (g) | Hydrogen permeability ($PH_2$) $\left( \dfrac{cm^3}{cm^2 \cdot sec\ cmHg} \right)$ | Permeating rate ratio $PH_2/P_{CO}$ |
| Example 5 | Phenanthrene | 336 | 8.1 | 100 | $2.4 \times 10^{-3}$ | 3.5 |
| Example 6 | O—terphenyl | 212 | 8.1 | 40 | $1.0 \times 10^{-2}$ | 2.6 |
| Example 7 | α-chloro-naphthalene | 259 | 8.1 | 100 | $5.2 \times 10^{-3}$ | 3.4 |
| Example 8 | Triphenyl phosphine | 360 | 7.4 | 18 | $4.5 \times 10^{-3}$ | 3.5 |
| Example 3 | Benzene | 80 | 9.2 | 20 | $9.1 \times 10^{-7}$ | 41 |
| Comparative Example 4 | Xylene | 138 | 8.5 | 15 | $9.8 \times 10^{-7}$ | 43 |
| Comparative Example 5 | 1,2,3-trichloro-benzene | 210 | 9.5 | 100 | $1.9 \times 10^{-6}$ | 40 |

Each organic polar solvent per se, which was used as the additional liquid in the examples and the comparative examples, was substantially incapable of dissolving the aromatic imide polymer powder having a degree of imidization of 95% or more and a logarithmic viscosity of 2.18.

From the results of Examples 5 through 8 and Comparative Examples 3 through 5, it is apparent that in the case where an organic polar solvent having a much higher boiling point than that of the base solvent was used as the additional liquid, the resultant porous membrane exhibited excellent properties as shown in Examples 5, 7, and 8. Also, it is evident that even when an organic polar solvent having a slightly lower boiling point than that of the base solvent was used as the addiis, in this case, the gas-permeating rate of the resultant imide polymer corresponded to that of the usual dense, nonporous membrane.

In addition, even when an organic polar solvent having a slightly lower boiling point than that of the base solvent was used as the additional liquid, when the ionization potential of the additional solvent was significantly higher than that of the base solvent, as is shown in Comparative Example 5, the resultant membrane exhibited a decreased gas-permeating rate because the additional liquid was evaporated more rapidly than the base liquid when the heating procedure was carried out on the thin layer of the dope solution. The membrane prepared in Comparative Example 5 exhibited a performance similar to that of the usual dense, nonporous membrane.

We claim:

1. A process for producing a porous aromatic imide polymer membrane, comprising the steps of:
    (1) dissolving 3 to 30% by weight of an aromatic imide copolymer which has a degree of imidization of at least 90% and comprises at least 80 molar % of at least one type of recurring unit selected from the group consisting of those of the formulae (I) and (II):

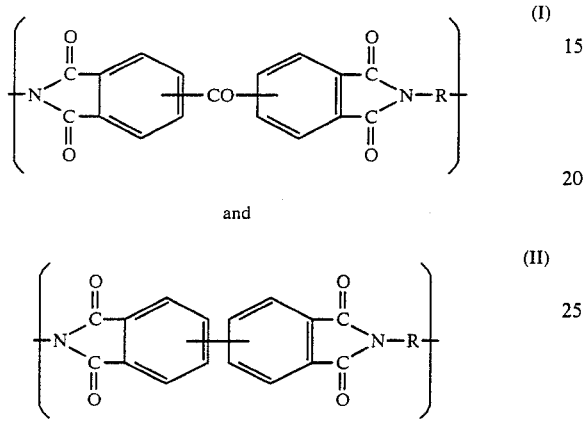

wherein R represents a member selected from divalent aromatic radicals, in 70 to 97% by weight of a solvent consisting essentially of a homogeneous mixture of:
    (A) 100 parts by weight of a base solvent consisting essentially of at least one polar organic compound, which base solvent is capable of dissolving therein said aromatic imide polymer in a concentration of 5% by weight of more therein and of evaporating at a temperature of from 50° to 400° C., and
    (B) 5 to 150 parts by weight of an additional liquid consisting essentially of at least one polar organic compound, which additional liquid is incapable of dissolving therein 3% by weight or more of said aromatic imide polymer and is capable of evaporating at a smaller evaporating rate than that of said base solvent at the above-mentioned evaporating temperature so as to provide a dope solution;
    (2) forming a thin layer of said dope solution; and
    (3) gradually and completely removing said solvent from said thin layer of said dope solution by means of a dry-evaporating method at a temperature of from 50° C. to 400° C., to form a porous aromatic imide polymer membrane.

2. The process as claimed in claim 1, wherein said aromatic imide polymer exhibits a logarithmic viscosity of from 0.3 to 7.0 determined at a concentration of 0.5 g per 100 ml of a solvent consisting of a mixture of four parts by volume of p-chlorophenol and one part by volume of o-chlorophenol at a temperature of 30° C.

3. The process as claimed in claim 1, wherein said aromatic imide polymer comprises at least 90 molar % of at least one type of recurring unit selected from the group consisting of those of the formulae (I) and (II).

4. The process as claimed in claim 1, wherein in said formulae (I) and (II), R represents a member selected from the group consisting of divalent radicals of the formulae

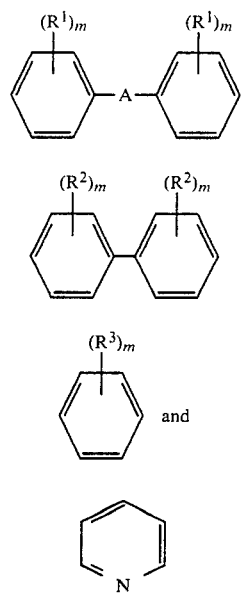

wherein $R^1$, $R^2$, and $R^3$, respectively, represent, independently from each other, a member selected from the group consisting of a hydrogen atom, lower alkyl radicals having 1 to 3 carbon atoms, and lower alkoxyl radicals having 1 to 3 carbon atoms; A represents a divalent linking member selected from the class consisting of —O—, —S—, —CO—, —SO$_2$—, —SO—, —CH$_2$—, and —C(CH$_3$)$_2$—; and m represents an integer of from 1 to 4.

5. The process as claimed in claim 1, wherein said base solvent consists essentially of at least one phenolic compound having a melting point of approximately 100° C. or less and a boiling point of approximately 300° C. or less under atmospheric pressure.

6. The process as claimed in claim 5, wherein said phenolic compound is selected from the group consisting of phenol, alkyl-substituted monohydric phenol compounds, and halogenated monohydric phenol compounds.

7. The process as claimed in claim 6, wherein said alkyl-substituted monohydric phenol compound is selected from the group consisting of o-, m-, and p-cresols, 3,5-xylenol, carvacrol, and thymol.

8. The process as claimed in claim 6, wherein said halogenated monohydric phenol compound is selected from the group consisting of those of the formula

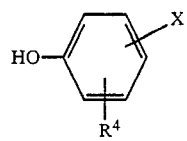

wherein $R^4$ represents a member selected from the group consisting of a hydrogen atom and alkyl radicals having 1 to 3 carbon atoms and X represents a halogen atom.

9. The process as claimed in claim 1, wherein said porous aromatic imide polymer membrane exhibits a hydrogen gas-permeating rate ($P_{H2}$) of 1.0 to $10^{-2}$ to $1.6 \times 10^{-4}$ cm$^3$/cm$^2$.sec.cmHg and a ratio ($P_{H2}/P_{CO}$) of the hydrogen gas-permeating rate ($P_{H2}$) to carbon monoxide gas-permeating rate ($P_{CO}$) of from 2.6 to 3.5 under a pressure of 3.0 kg/cm$_2$G.

10. The process as claimed in claim 1, wherein said additional liquid consists of at least one member selected from the group consisting essentially of phenanthrene, o-terphenyl, p-terphenyl, α-chloronaphthalene, triphenylphosphine, triphenylamine, aniline, naphthalene, 1-methylnaphthalene, 2-methylnaphthalene, dimethylnaphthalene, anthracene, and 1,2-benzanthracene.

11. The process as claimed in claim 1, wherein said thin layer-forming procedure is carried out at a temperature of from approximately 50° C. to 180° C.

12. The process as claimed in claim 11, wherein said heating procedure is carried out firstly at a temperature of from 50° to 150° C., secondly at a temperature of from 30° to 80° C. above the first temperature, and finally at a temperature of from 30° to 80° C. above the second temperature.

13. The process as claimed in claim 1, wherein said dope solution exhibits a rotation viscosity of at least 500 centi-poises at the thin layer-forming temperature.

14. A porous aromatic imide polymer membrane prepared by the process as claimed in claim 1.

* * * * *